Jan. 5, 1937.　　　D. R. HOLDEN　　　2,067,010
DRIVING ATTACHMENT
Filed Dec. 11, 1935
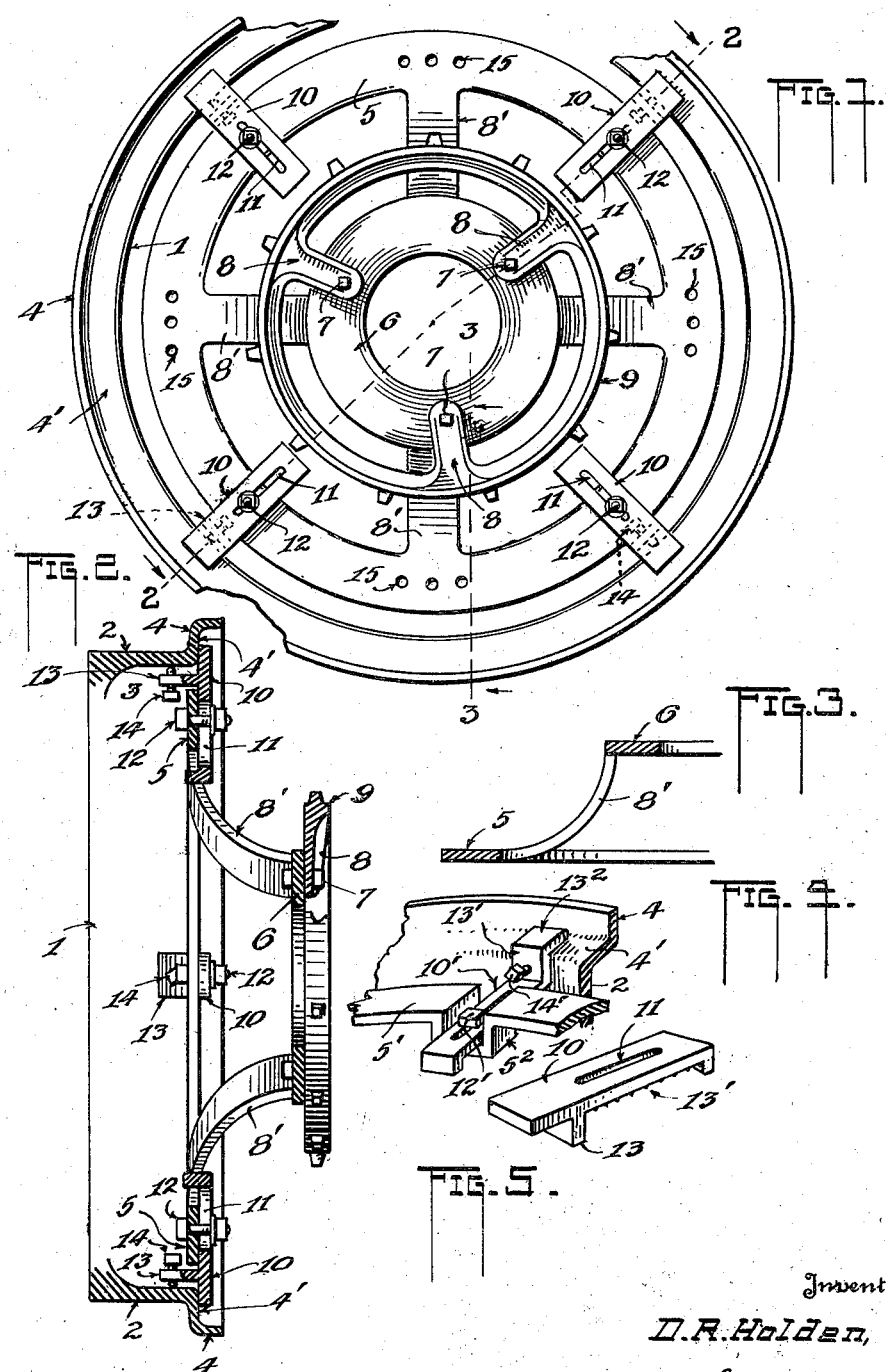

Patented Jan. 5, 1937

2,067,010

UNITED STATES PATENT OFFICE 2,067,010

DRIVING ATTACHMENT

David R. Holden, Peoria, Ill.

Application December 11, 1935, Serial No. 53,915

7 Claims. (Cl. 74—15)

This invention pertains to driving attachments for rotating members.

More specifically, said invention has to do with means for mounting a driving wheel upon the rotating part of a wheel of a vehicle.

It is often expedient, or very desirable, to drive a machine member such as the wheel of a seeding machine, for example, from the ground or supporting wheel of a truck carrying such seeding machine and therefore:

One of the purposes of the present invention is to provide a simple easily attached structure to the truck-wheel by which a sprocket wheel for example may be located in driving position in line with the wheel to be driven.

Another purpose or object is to furnish a simple manner of attaching and easily detaching such a structure to the metal tire of said truck, the said structure being so arranged and appointed that it may be adapted to any size of such tire; that the wheel carried by it can automatically take up a plane of rotation paralleling the plane of tire rotation; and that such structure can be positively fixed relative to the tire.

To the end that the invention may be thoroughly understood I have provided the appended drawing wherein Figure 1 is a side elevation of the metal tire of a truck wheel, for example, showing my invention applied thereto.

Figure 2 is a transverse section of the same as produced on line 2—2 of said Figure 1.

Figure 3 is a transverse section of the structure of Figure 1 as produced on line 3—3 of the latter figure.

Figure 4 illustrates a slight modification in perspective of the structure shown in Figures 1 and 2.

Figure 5 shows in perspective an adjustable supporting plate shown in both Figures 1 and 2.

Trucks for the farm or even for other uses often carry upon them machines requiring operation by power and since the ground wheels or carrying wheels of the vehicle provide for ready power, either when the said vehicle is in motion or when raised to permit rotation of a wheel by the engine or motor driving such vehicle, a structure including a drive wheel when affixed to such wheel answers the requirement.

Many of these truck wheels as now provided are of either the military type or a disc type the steel rim or tire of any one of which has a deep recess in its outer side within which a sprocket carrying structure may be placed and secured as will be understood from the following description:

In Figure 2 of the drawing 1 represents one of the types of metal wheel mentioned herein provided with a tire or rim 2 cavitied at 3, said tire having an extended flange 4 for the reception of any used rubber or other tire, not shown.

My invention for use therewith includes a body or spider comprising a ring 5 to lie within the cavity 3, and a second smaller ring 6 spaced outwardly therefrom the two lying parallel to each other and rotatable about a common axis centered with the axis of rotation of the wheel 1, being connected by arms or spokes 8'.

The ring 6 is provided with holes, not shown, to receive bolts 7 by which to secure to said ring by means of arm 8 a power take-off wheel such as a sprocket wheel 9, for example, of any desired diameter, or number of teeth.

The said ring 5 has mounted on its outer face, in this instance, a series of radiating plates 10 provided each with a slot 11 through which extends a bolt 12 by which said plate can be affixed to said ring in any desired position of adjustment.

Said plates 10 extend from the periphery of the ring 5 and are designed to lie upon the annular shoulder 4' of the tire-flange 4 referred to as clearly shown in the figures.

Extending from the under side or inner side of each plate is a lug 13 lying between the tire 2 and said ring 5 and each lug has a set screw 14 to abut the said tire on its inner surface. In addition to this equipment the ring 5 may have holes 15 at spaced positions around the same for a purpose to appear.

Said ring 5 is of such a size that it will readily lie within the tire of any size of wheel 1 and due to the adjustability of the plates 10 the largest wheel may still be fitted.

Naturally, when the plates 10 are clamped to the ring the latter when placed in position will take up a plane paralleling that of the wheel's rotation and thereby the sprocket 9 will rotate in a true plane paralleling the plane of rotation of said wheel 1.

When the bolts 12 are tightened properly there will be no movement of the plates 10 relative to said ring 5 and in order to provide for extra frictional grip between these members they may be roughened on their meeting surfaces, the roughening of the plate 10 being suggested at 13' in Figure 4.

Upon locating the plate 5 centrally of the tire the set screws 14 may be tightened to grip the said tire and said set screws may even be employed to exactly center said ring by loosening one or more and tightening others in a well known way for accomplishing such a purpose.

It is thus seen that I provide an expandible holding structure for carrying a driving member and therefore one that can be employed to engage an inner surface of any wheel.

However the structure is adaptable for use on a wheel having spokes, for example, where there is no chance to engage an inner surface such as shown herein. That is to say, the mentioned holes 15 in the ring 5 may receive suitable holding members to engage said spokes.

In Figure 4 the ring 5' corresponding to 5 of the earlier figures is provided with a yoke-portion 5² extending below the plane thereof, and in this is located a plate 10' slotted as before and secured by a bolt 12', said plate in this instance having an outwardly extending portion 13' provided with a terminal portion 13² to lie upon the named shoulder 4' of the tire rim, the set screw 14' serving to secure the whole to the tire as in the other figures. It is observed that in this form of arrangement the said set screw 14' can be more readily reached with a tool than is true of the earlier form.

In addition to the foregoing arrangement it is clear that either of the plates 10, 10' or the equivalent thereof may be permanently a part of the ring 5, 5', respectively, and the set screws may be long enough to engage tires of various diameters.

While I have shown ways of clamping the body or spider 5, 5' to the wheel-tire or rim I may provide other ways of securing the same to the latter as lying within the meaning and intent of the invention and as lying within the scope of certain of the claims to follow.

I claim:

1. In combination with the rim of a wheel, said rim having a face substantially parallel to the axis of rotation and a surface substantially paralleling the plane of rotation, of a body of a diameter less than that of the inner diameter of such rim, the same adapted for suspension free of the wheel and its rim, members mounting on the body adapted for adjustment radially thereof and abutting said surface of the rim, and each member having a portion adjacent the named face of the latter, means to separately fix the members with respect to the body, means carried by the portion of each member, each of the means being adjustable and adapted to engage the rim at its said face to fix the structure and rim relatively, and a wheel fixed relatively to said structure.

2. In combination with a ground wheel or supporting wheel of a vehicle, the rim of the same having an exposed surface inward therefrom, a body arranged to be supported upon and to rotate with said wheel and itself carrying a wheel, members secured on the body adapted to be adjusted radially and to bear upon said rim of the ground wheel, and set screws carried by and adjustable in certain of the members adapted to be moved into gripping engagement with the inner surface of said rim.

3. The combination with a main wheel having an annular inner face substantially paralling the axis of rotation, and also having a surface disposed substantially at right angles to said axis, of a body to be supported at said wheel, a wheel carried by the body spaced outwardly from the plane of the main wheel, members secured upon the body arranged to abut upon the named surface of the said main wheel, means carried by certain of the members adjustable with respect thereto adapted to engage the said annular inner face of the main wheel for securing the body frictionally with respect to the latter, and means to secure the members in fixed adjustment upon the body.

4. The combination with a main wheel having an annular inner face substantially paralleling the axis of rotation, and also having a surface disposed substantially at right angles to said axis, of a body for support at the wheel, a wheel carried by the body and outwardly spaced from the plane of the main wheel, members adjustably mounted on the body radially and lying upon said surface of the main wheel and each having a part to lie within said main wheel adjacent the said inner annular face thereof, adjustable means carried by each part to frictionally engage the named main-wheel face, and clamping means to fix the said members to said body.

5. The combination with a main wheel having an annular inner face substantially paralleling the axis of rotation, and also having a surface disposed in a plane substantially at right angles to said axis, of a body disposed within the wheel inward from the named surface of the wheel adapted to rotate with said wheel and carrying a power take-off wheel spaced outward from the plane of such main wheel, a member mounted on the body at each of a plurality of positions therearound adjustable radially thereon, each said member having a terminal portion offset therefrom adapted to lie upon the named surface of the main wheel, a securing member carried by each terminal portion to engage the said annular inner face of the said main wheel, said securing member lying adjacent that surface of said body that faces the power take-off wheel carried by said body, and means to secure each first-named member to said body.

6. The combination with a main wheel having an annular inner face substantially paralleling the axis of rotation, and also having a surface disposed in a plane substantially at right angles to said axis, of a body disposed within the wheel inward from the named surface of the same adapted to rotate with said wheel, and carrying a power take-off wheel spaced outwardly from the plane of the latter, said body having a series of yoke portions extending inwardly into the main wheel each providing an exposed recess facing the power take-off wheel, a member seated in each recess adjustable radially of the body and having a terminal portion offset toward the said wheel of said body and bearing upon the named surface of the main wheel, means to secure each member with respect to the body, and a securing member in each of the thus seated members adapted to frictionally engage the said annular inner face of the main wheel, said securing member being accessible from the power take-off wheel side of the body.

7. The combination with a main wheel having an annular inner face substantially paralleling the axis of rotation, and also having a surface disposed in a plane substantially at right angles to said axis, of a body disposed within the wheel inward from the named surface of the same adapted to be rotated with said wheel and carrying a power-take-off wheel spaced outwardly from the plane of the latter, a member mounted on the body at each of several positions adapted for adjustment radially thereon, means to fix the members to the body, each member including an L-shaped portion providing a part adapted to abut the named surface of the main wheel and a part to substantially parallel the said inner face of the latter, and means carried by each L-shaped portion to engage the said inner face for fixing the member and body with respect to the main wheel, the several means being exposed toward the named power-take-off wheel outward from that surface of the body facing the last named wheel.

DAVID R. HOLDEN.